(12) United States Patent
Soika et al.

(10) Patent No.: US 10,589,379 B2
(45) Date of Patent: Mar. 17, 2020

(54) METHOD FOR PRODUCING A TUBE FROM METAL

(71) Applicant: NEXANS, Paris (FR)

(72) Inventors: Rainer Soika, Donaueschingen (DE); Claus-Friedrich Theune, Wennigsen (DE)

(73) Assignee: NEXANS, Courbevoie (FR)

( * ) Notice: Subject to any disclaimer, the term of this patent is extended or adjusted under 35 U.S.C. 154(b) by 415 days.

(21) Appl. No.: 15/495,359

(22) Filed: Apr. 24, 2017

(65) Prior Publication Data

US 2017/0312854 A1    Nov. 2, 2017

(30) Foreign Application Priority Data

Apr. 29, 2016   (EP) .................................... 16305500

(51) Int. Cl.
| | |
|---|---|
| *B23K 26/262* | (2014.01) |
| *B23K 31/02* | (2006.01) |
| *B21C 37/08* | (2006.01) |
| *B23K 26/0622* | (2014.01) |
| *B23K 26/60* | (2014.01) |
| *B23K 26/03* | (2006.01) |
| *B23K 101/06* | (2006.01) |
| *B23K 101/36* | (2006.01) |

(52) U.S. Cl.
CPC ............ *B23K 26/262* (2015.10); *B21C 37/08* (2013.01); *B21C 37/0807* (2013.01); *B23K 26/034* (2013.01); *B23K 26/0622* (2015.10); *B23K 26/60* (2015.10); *B23K 31/027* (2013.01); *B23K 2101/06* (2018.08); *B23K 2101/36* (2018.08)

(58) Field of Classification Search
CPC .. B23K 26/262; B23K 26/034; B23K 31/027; B21C 37/0807; B31C 37/08
See application file for complete search history.

(56) References Cited

U.S. PATENT DOCUMENTS

| | | | | |
|---|---|---|---|---|
| 5,658,473 A | * | 8/1997 | Ziemek | .................. B21C 37/08 219/121.64 |
| 5,968,380 A | | 10/1999 | Hayashi et al. | |
| | | | (Continued) | |

OTHER PUBLICATIONS

Search Report dated Oct. 17, 2016.

*Primary Examiner* — Geoffrey S Evans
(74) *Attorney, Agent, or Firm* — Sofer & Haroun, LLP

(57) ABSTRACT

A method for producing a tube from metal is stated, by use of which method a metal strip by means of a drawing-off installation is moved in the longitudinal direction of said metal strip and is guided through a forming station in which said metal strip is formed to a slot tube having a slot running the in the longitudinal direction. The two edges of the metal strip abut to one another at the slot. Said two ends for producing a fully closed tube are welded to one another by use of a welding installation that is equipped with a laser. The slot tube after leaving the forming station is initially moved into the region of the laser and is then stopped. Thereafter, the regions of the edges of the slot tube that are to be welded to one another are pre-treated by the laser. Thereafter, the power of the laser is set to the welding power thereof that corresponds to the welding temperature, and by switching on the drawing-off installation the slot tube is simultaneously moved in the longitudinal direction of the latter.

4 Claims, 1 Drawing Sheet

(56) References Cited

U.S. PATENT DOCUMENTS

| | | |
|---|---|---|
| 7,094,988 B1 | 8/2006 | Taylor |
| 2012/0000892 A1 | 1/2012 | Nowak et al. |
| 2014/0091064 A1 | 4/2014 | Egerer et al. |

\* cited by examiner

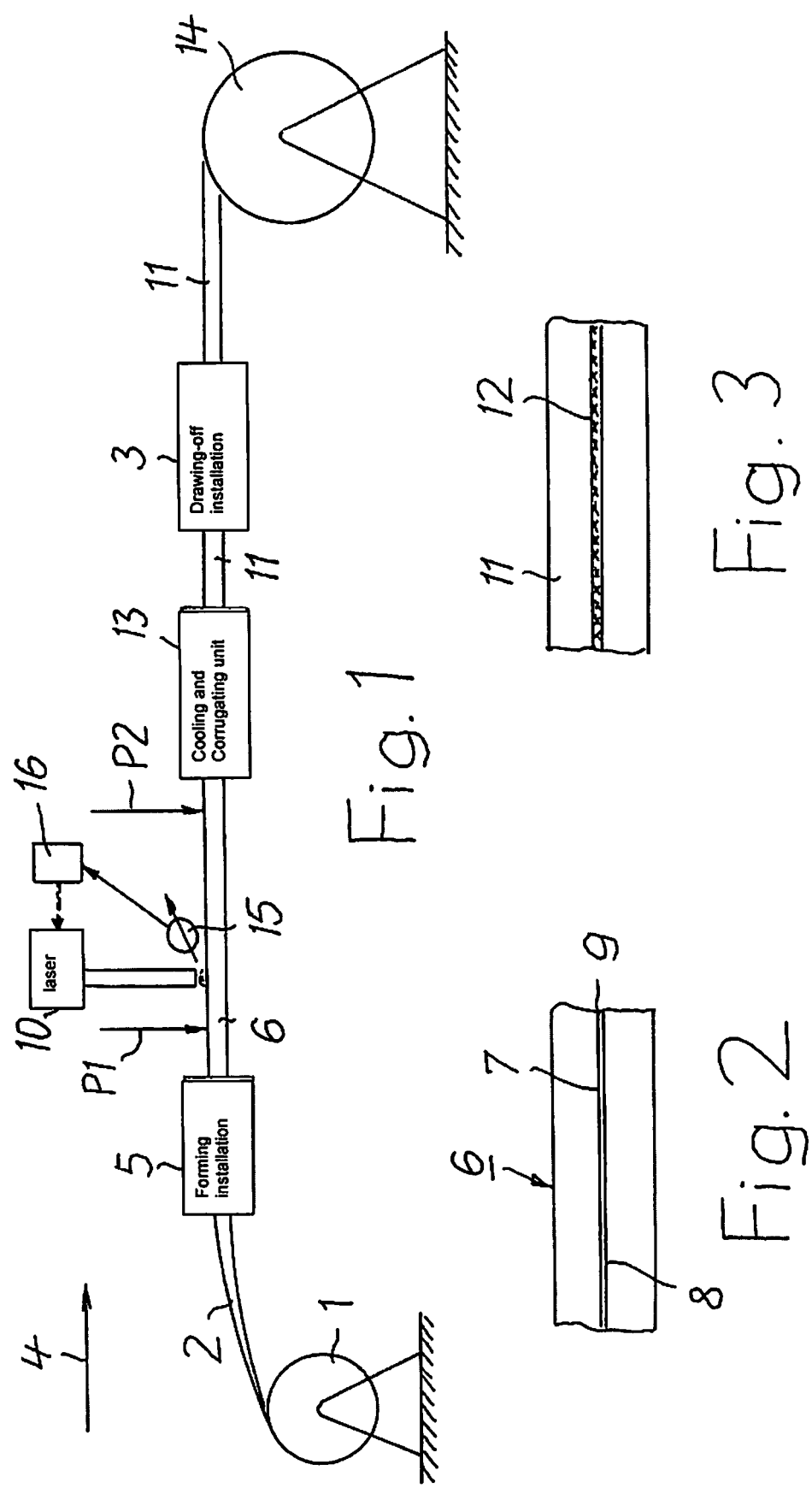

METHOD FOR PRODUCING A TUBE FROM METAL

RELATED APPLICATION

This application claims the benefit of priority from European Patent Application No. 16 305 500.7, filed by Apr. 29, 2016, the entirety of which is incorporated reference.

BACKGROUND

Field of the Invention

The invention relates to a method for producing a tube from metal, by use of which method a metal strip by means of a drawing-off installation is moved in the longitudinal direction of said metal strip and is guided through a forming station in which said metal strip is formed to a slot tube having a slot running in the longitudinal direction, the two edges of the metal strip abutting to on one another at said slot, and by use of which method the edges of the metal strip for producing a fully closed tube are welded to one another by use of a welding installation that is equipped with a laser, (DE 44 34 134 A1).

Description of the Related Art

Tubes from metal can serve for conveying liquid or gaseous media. Said tubes can also be employed as electrical conductors, for example in coaxial high-frequency cables. Another field of application is that of electrical and/or optical cables in which a tube from metal can serve as protection for an enclosed cable core. The tubes in all potential embodiments can be embodied as plain tubes. However, in order for their flexural characteristics to be improved, said tubes can also be corrugated transversely to the longitudinal direction of said tubes, specifically in a helical or annular manner.

A method by way of which a tube is produced from a metal strip is described in DE 44 34 134 A1 mentioned at the outset, said metal strip being continuously drawn off from a coil by means of a drawing-off installation and supplied to a forming installation. The metal strip in the forming installation is formed to a slot tube which is continuously moved onward in the longitudinal direction of said tube, the lateral edges of the latter bearing on one another at a slot running in the longitudinal direction. In the case of this method the lateral edges are welded to one another using a laser, or a laser welding installation, respectively. The material of the metal strip herein is fused on both lateral edges. The lateral edges are mutually compressed by tools, such that said lateral edges after cooling are fixedly interconnected by way of a weld seam. The tube that thereafter is fully closed can be wound onto a coil or be supplied to further processing. A laser that is used for welding the lateral edges of the metal strip, once the former has been switched on to an electrical power source, requires one minute to three minutes, for example, or even longer until said laser has reached the welding power thereof that is required for effective welding of the lateral edges of the metal strip. Depending on the material, the metal strip is drawn off from the coil and moved through the forming installation at a speed of 2 m/min, for example. The slot between the lateral edges of the metal strip that is continuously being moved onward is not at all or only insufficiently welded while the laser is heating up to the welding power of the latter. The respective length of the tube that is produced herein is unfit for use. Said length becomes scrap.

OBJECTS AND SUMMARY

The invention is based on the object of designing the method described at the outset such that the length of the tube that due to substandard welding is unfit for use can be significantly reduced.

This object is achieved according to the invention in
that the slot tube after leaving the forming station is initially moved into the region of the laser and is then stopped;
that thereafter the regions of the edges of the slot tube that are to be welded to one another are pre-treated by the laser;
that thereafter the power of the laser is set to the welding power thereof that corresponds to the welding temperature; and
that by switching on the drawing-off installation the slot tube is simultaneously moved in the longitudinal direction of the latter.

When this method is applied, the slot between the two edges of the metal strip is closed by use of a weld seam as soon as the material at the edges of the metal strip by use of the pre-treatment by the laser is transformed to a state in which the laser energy that corresponds to the welding power of the laser can be coupled into the edges to be welded. The weld seam is then immediately generated in a fully effective manner when the laser is set to the welding power of the latter and the slot tube is simultaneously moved by means of the drawing-off installation. Since the material of the lateral edges is pre-treated in a targeted manner by the laser and herein is preheated to a predefined starting temperature, for example, the laser power herein is fully coupled into the welding region such that the material of the edges of the metal strip is directly fused. On account thereof, the non-utilizable length of an only insufficiently welded slot tube can be minimized.

The laser during the pre-treatment of the edges of the metal strip, or of the slot tube, respectively, can be set to an power that is reduced in comparison to the welding power thereof. This reduced power of the laser can be utilized for example for heating the edges of the metal strip, or for modifying the structure of the surface of the latter, respectively.

An identical result can be achieved when the laser is set to the welding power thereof or at least approximately to the welding power thereof, the energy being radiated herein however being supplied only to the edges of the metal strip in a pulsed manner.

Both variants for setting the laser power can also be applied when the ongoing manufacturing of the tube is interrupted by the deactivation of the drawing-off installation. This can be required for example when a further length of metal strip is to be welded to the metal strip in order for a tube of greater length to be able to be produced. The laser in this instance is advantageously set to one of the pre-treatment states described. The welding power of said laser is then set again once the metal strip has been extended in length and when the drawing-off installation is simultaneously switched on again.

While the method is being carried out, the temperature in the welding region is advantageously measured by means of a temperature sensor which can be an infrared temperature sensor, for example. The measured values of said temperature sensor can be uploaded to a regulator by way of which the operating mode of the laser can be regulated as determined by predefined nominal values.

BRIEF DESCRIPTION OF THE DRAWINGS

The method according to the invention will be explained as an exemplary embodiment by means of the drawing.

In the drawing:

FIG. 1 schematically shows a system for carrying out the method according to the invention.

FIG. 2 shows an enlarged fragmented illustration of a view corresponding to the arrow P1 in FIG. 1.

FIG. 3 shows a likewise enlarged fragmented illustration of a view corresponding to the arrow P2 in FIG. 1.

DETAILED DESCRIPTION

A coil onto which a metal strip 2 which is composed of stainless steel or copper, for example, is wound referred to with 1. The metal strip 2 is drawn off from the coil 1 by way of a drawing-off installation 3 and is moved in the direction of the arrow 4 through assemblies or apparatuses, respectively, of the system illustrated in FIG. 1.

One of the apparatuses is a forming installation 5 in which the metal strip 2 is formed to a slot tube 6. In the slot tube the two longitudinal edges 7 and 8 of the metal strip 2 bear on one another at a slot 9 running in the longitudinal direction, in a manner corresponding to FIG. 2. A further apparatus is a laser welding installation or a laser 10, respectively, the slot tube 6 being continuously moved past the former in the direction of the arrow 4 as the method is carried out. The laser 10 welds the edges 7 and 8 of the metal strip 2 to one another, such that a tube 11 having a continuous weld seam 12 according to FIG. 3 results. Further potential apparatuses of the system, such as, for example, a tool for compressing the edges 7 and 8, a cooling installation, and an installation for corrugating the tube 11 are indicated by a small box 13. The finished tube 11 can be wound onto a coil 14 or be supplied to further processing or machining, respectively.

The method according to the invention is carried out as follows, for example:

The metal strip 2 by means of a drawing-off unit is drawn off from the coil 1 in the direction of the arrow 4 and is pulled through the forming installation 5. In the forming installation 5 said metal strip 2 is formed to the slot tube 6 which is moved onward to a drawing-off installation 3, for example, which is suitable or configured for drawing a tube, respectively. The metal strip 2 or the slot tube 6 that has already been formed from the former, respectively, is then stopped by deactivating the drawing-off unit.

Thereafter, the slot 9 of the slot tube 6 lies in the region of the laser 10. The laser 10 can then be connected to a power source and be started up until a temperature that corresponds to a desired power has been reached. However, this can also be performed prior to commencing the movement of the metal strip 2 or else while the latter is being moved.

The edges 7 and 8 of the metal strip 2 are then pre-treated by the laser 10. The material of the metal strip 2 herein in the region of the edges 7 and 8 is heated or structured, for example, such that the energy that is generated by the laser 10 at the welding temperature of the latter can be coupled into said material without any impediment. The laser 10 herein can be set to a temperature that is lower in comparison to the welding temperature thereof, for example. However, said laser can also be used in a pulsating operating mode.

After sufficient pre-treatment of the edges 7 and 8 of the metal strip 2, the laser 10 is set to the welding power thereof in a continuous operating mode. On account thereof, the material at the edges 7 and 8 of the slot tube 6 is melted. The slot tube 6 by switching on the drawing-off installation 3 is then continuously moved in the direction of the arrow 4. On account thereof, the fully closed tube 11 is created by the weld seam 12.

In a manner analogous to the described operating mode, the method can also be applied when manufacturing is interrupted, for example in order for a further length of metal strip to be welded to the metal strip 2, said further length being required for producing a tube 11 of greater length. The laser 10 in this instance is set to the operating mode thereof that corresponds to the pre-treatment of the metal strip 2, and the drawing-off installation 3 is stopped. Continuous manufacturing as has been described is resumed thereafter.

In order for the parameters that have been described above, in particular the various temperatures, to be adhered to, a temperature sensor 15 is advantageously disposed in the welding region, the measured values of said temperature sensor 15 being evaluated and to this end being uploaded to an evaluation unit or to a regulator 16, respectively. The temperature sensor 15 can be an infrared temperature sensor, for example. The regulator 16 regulates the operating mode of the laser 10 as determined by predefinable nominal values.

The invention claimed is:

1. Method for producing a tube from metal, said method comprising the steps of:
    a metal strip, by means of a drawing-off installation, is moved in the longitudinal direction of said metal strip;
    said metal strip is guided through a forming station in which said metal strip is formed to a slot tube having a slot running in the longitudinal direction,
    the two edges of the metal strip abutting to one another at said slot are laser welded to one another by a laser welding installation that is equipped with a laser producing a fully closed tube,
    wherein the slot tube, after leaving the forming station, is initially moved into the region of the laser and is then stopped;
    wherein, thereafter, the regions of the edges of the slot tube that are to be welded to one another are pre-treated by the laser;
    wherein, thereafter, the power of the laser is set to the welding power thereof that corresponds to the welding temperature; and
    wherein, by switching on the drawing-off installation the slot tube is simultaneously moved in the longitudinal direction of the drawing-off installation.

2. Method according to claim 1, wherein the laser during the pre-treatment of the edges of the slot tube is set to a power that is reduced in comparison to the welding power that corresponds to the welding temperature.

3. Method according to claim 1, wherein the laser during the pre-treatment of the slot tube emits pulses.

4. Method according to claim 1, wherein the temperature in the welding region is measured by means of a temperature sensor the measured values of which are uploaded to an evaluation unit or to a regulator, respectively.

* * * * *